US009722493B1

(12) United States Patent
Sheron et al.

(10) Patent No.: US 9,722,493 B1
(45) Date of Patent: Aug. 1, 2017

(54) POWER CONVERTER FOR GROUND-REFERENCED SYSTEM AND FLOATING SYSTEM

(71) Applicant: General Electric Company, Schenectady, NY (US)

(72) Inventors: Bennett Steven Sheron, Schenectady, NY (US); Lukas Mercer Hansen, Niskayuna, NY (US); Wayne Allen Schulz, Binghamton, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/011,755

(22) Filed: Feb. 1, 2016

(51) Int. Cl.
*H02M 3/158* (2006.01)
*H02M 3/157* (2006.01)
*H02M 1/00* (2006.01)

(52) U.S. Cl.
CPC .......... *H02M 3/158* (2013.01); *H02M 3/157* (2013.01); *H02M 3/1588* (2013.01); *H02M 2001/009* (2013.01); *H02M 2001/0093* (2013.01)

(58) Field of Classification Search
CPC ... H02M 2001/009; H02M 2001/0093; H02M 3/158; H02M 3/1588; H02M 3/157
See application file for complete search history.

(56) References Cited

U.S. PATENT DOCUMENTS

| 5,583,421 A | 12/1996 | Barbehenn et al. | |
|---|---|---|---|
| 8,970,161 B1* | 3/2015 | Cuadros | H02J 7/0068 320/101 |
| 2006/0284490 A1* | 12/2006 | Kumar | H02M 3/158 307/82 |
| 2010/0264869 A1* | 10/2010 | Dubovsky | G05F 1/67 320/102 |
| 2012/0169126 A1* | 7/2012 | Totterman | H02M 3/1582 307/66 |
| 2014/0229031 A1 | 8/2014 | Amarin et al. | |

* cited by examiner

*Primary Examiner* — Timothy J Dole
*Assistant Examiner* — Ishrat Jamali
(74) *Attorney, Agent, or Firm* — Dority & Manning, P.A.

(57) ABSTRACT

Power converters that can allow for the transfer of DC power between a ground-referenced bus and a floating system are provided. In one embodiment, the power converter includes a ground-referenced DC bus associated with a DC voltage. The power converter further includes a first switching element, a second switching element, and a third switching element coupled in series between the ground-referenced DC bus and a ground reference. The power converter further includes a floating system associated with a floating DC voltage. The floating system can include a first terminal coupled to a first node between the first switching element and the second switching element. The floating system can further include a second terminal coupled to a second node between the second switching element and the third switching element.

17 Claims, 6 Drawing Sheets

POWER CONVERTER FOR GROUND-REFERENCED SYSTEM AND FLOATING SYSTEM

FIELD OF THE INVENTION

The present disclosure relates generally to power converters for converting power between a ground-referenced system and a floating system.

BACKGROUND OF THE INVENTION

Energy storage systems (e.g., battery energy storage systems) have become increasingly used to deliver power either as part of standalone energy storage systems or as part of power generation systems (e.g., a wind farm, solar farm, gas turbine system) with an integrated energy storage system. Energy storage systems are unique in that energy storage systems have the ability to both deliver and reserve energy for particular services. Energy storage systems can include one or more battery banks that can be coupled to the grid or other load via a suitable power converter.

FIG. 1 depicts a schematic of a power converter topology 50 that can be used to interface a low voltage bus 60 with a high voltage bus 70. As shown, the low voltage bus can be coupled to a node between switching element S1 and switching element S2 through inductor L1. The switching elements S1 and S2 can be power switching devices, such as insulated gate bipolar transistors (IGBTs), power MOSFETs, or other suitable switching devices. The switching elements S1 and S2 can be controlled to transfer power between the low voltage bus 60 and the high voltage bus 70. Low voltage bus 60 is referenced to ground through capacitor C1. High voltage bus 70 is referenced to ground through capacitor C2. Both the low voltage bus 60 and the high voltage bus 70 are ground-referenced.

High voltage batteries used in energy storage systems are often operated in floating systems to facilitate insulation between the system components and ground. In some cases, it can be desirable to connect the energy storage system to a ground-referenced bus for sourcing or sinking power. For instance, in can be desirable to allow a grounded, high voltage photovoltaic array to be used to charge a floating battery system. The power converter topology 50 of FIG. 1 would be inappropriate for such applications as the power converter topology 50 is intended for bidirectional power transfer between two ground-referenced systems. Transformer-based power converters can be used to couple a floating system with a ground-referenced bus. This can provide for galvanic isolation but can also cause a reduction in efficiency.

Thus, a need exists for a power converter topology that allows power to be transferred bidirectionally between a floating system and a ground-referenced system.

BRIEF DESCRIPTION OF THE INVENTION

Aspects and advantages of the embodiments of the present disclosure will be set forth in part in the following description, or can be learned from the description, or can be learned through practice of the embodiments.

One example aspect of the present disclosure is directed to a DC to DC power converter. The power converter includes a ground-referenced DC bus associated with a DC voltage. The power converter further includes a first switching element, a second switching element, and a third switching element coupled in series between the ground-referenced DC bus and a ground reference. The power converter further includes a floating system associated with a floating DC voltage. The floating system can include a first terminal coupled to a first node between the first switching element and the second switching element. The floating system can further include a second terminal coupled to a second node between the second switching element and the third switching element.

Another example aspect of the present disclosure is directed to a method of controlling a DC to DC power converter for bidirectional power transfer between a floating system and a ground-referenced DC bus. The power converter can include a first switching element, a second switching element, and a third switching element coupled in series between the ground-referenced DC bus and a ground reference. The floating system can further include a first terminal coupled to a first node between the first switching element and the second switching element and a second terminal coupled to a second node between the second switching element and the third switching element. The method can include receiving, by one or more control devices, data indicative of a setpoint for the floating system and determining, by the one or more control devices, a pulse width modulation scheme for switching the first switching element synchronously with the third switching element based on the setpoint. The method can further include controlling, by the one or more control devices, the switching of the first switching element synchronously with the third switching element based on the pulse width modulation scheme and controlling, by the one or more control devices, the switching of the second switching element so that the second switching element is conducting during at least a portion of a period when the first switching element and the third switching are non-conducting.

Another example aspect of the present disclosure is directed to a power system. The power system includes a ground-referenced DC bus coupled to a photovoltaic array system. The power system further includes a first switching element, a second switching element, and a third switching element coupled in series between the ground-referenced DC bus and a ground reference. The system further includes a floating system coupled to at least one battery energy storage device. The floating system includes a first terminal coupled to a first node between the first switching element and the second switching element. The floating system further includes a second terminal coupled to a second node between the second switching element and the third switching element. The power system further includes a control system configured to control switching of the first switching element, the second switching element, and the third switching element. The control system is configured to switch the first switching element and third switching element synchronously with one another. The control system further configured to switch the second switching element in a manner complementary to the first switching element and the third switching element.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
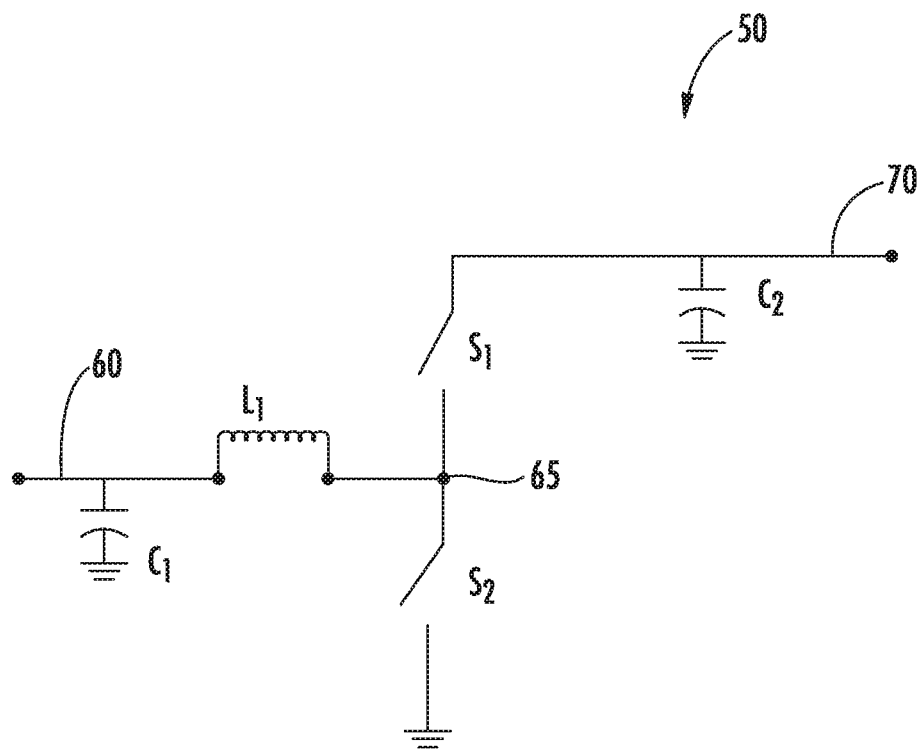
FIG. 1 depicts a circuit diagram of an example half bridge DC to DC power converter topology.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to power converters that can allow for the transfer of DC power between a ground-referenced bus and a floating system. As used herein, a "ground-referenced DC bus" is a bus that is associated with a DC voltage with respect to a ground reference. For instance, in some implementations, the ground-referenced bus can include a terminal or conductor (e.g., a negative terminal or conductor) that is grounded. A floating system does not include a terminal or conductor that is grounded.

The power converter can be a DC to DC power converter that can accommodate bi-directional power flow between the ground-referenced bus and the floating bus. For instance, in one implementation, the power converter can be used to transfer power to or from a floating energy storage system as part of the charging or discharging of energy storage devices (e.g., battery energy storage devices).

In some embodiments, the power converter can include a first switching element, a second switching element, and a third switching element coupled in series (e.g., in a totem pole arrangement) between a ground-referenced DC bus and a ground reference. The first switching element, the second switching element, and the third switching element can be, for instance, a power switching device such as an IGBT, power MOSFET, or other suitable power switching element. The floating system can be coupled to the switching elements such that a first terminal of the floating system is coupled to a first node between the first switching element and the second switching element and a second terminal of the floating system is coupled to a second node between the second switching element and the third switching element.

A control system can be used to control switching of the first switching element, the second switching element, and the third switching element (e.g., using pulse width modulation PWM) to allow bidirectional power transfer between the floating system and the ground-referenced bus. In some embodiments, the first switching element and the third switching element can be controlled to be switched synchronously with one another. As used herein, switching elements are switched "synchronously" with one another when the switching elements have the same state (e.g., either conducting or non-conducting) for at least 80% of a switching cycle. A switching cycle can refer to one period of a periodic switching cycle used, for instance, in a pulse width modulation scheme.

In some embodiments, the second switching element can be controlled to be switched complementary to the first switching element and the third switching element. As used herein, a switching element is switched complementary relative to one or more other switching elements when the switching element is switched so as to have an opposite state (e.g., either conducting or non-conducting) relative to the one or more other switching elements. For instance, the second switching element can be controlled to be in a conducting state for at least a portion of a period when the first switching element and the third switching element are in a non-conducting state. In addition, the second switching element can be controlled to be in a non-conducting state for at least a portion of a period when the first switching element and the third switching element are in a conducting state.

The power converter architecture according to example aspects of the present disclosure can be used, for instance, to allow a ground-referenced photovoltaic array to be used to charge a floating battery energy storage system. In this particular example implementation, the converter can be working in a buck mode, stepping down a higher voltage associated with the photovoltaic array to a lower voltage associated with the floating battery energy storage system. The control system can be controlled to regulate the current to the battery energy storage devices in the battery energy storage system in order to charge the battery energy storage devices properly.

A power converter according to example aspects of the present disclosure can be used in other applications involving a ground-referenced bus and a floating system. For instance, two battery energy storage systems can be coupled to the power converter, with one being ground-referenced and the other floating. A power converter according to example aspects of the present disclosure can also be used to drive another power device expecting a ground-referenced or a floating input, such as an inverter.

The power converter according to example aspects of the present disclosure can provide for power flow between to DC systems, one floating and one ground-referenced. This can be performed without the use of isolation (e.g., isolation transformers) leading to an efficiency gain relative to systems using isolation transformers. Additionally, power flow can be controlled, for instance, to allow for different battery charging algorithms in battery energy storage systems. Moreover, implementing the power converter architecture according to example embodiments of the present disclosure can only require one additional switching element relative to common half-bridge buck/boost power converters. In addition, the control of the switching elements can be relatively straightforward as, in some embodiments, only two complementary pulse width modulation switching schemes are required.

Figure 2:
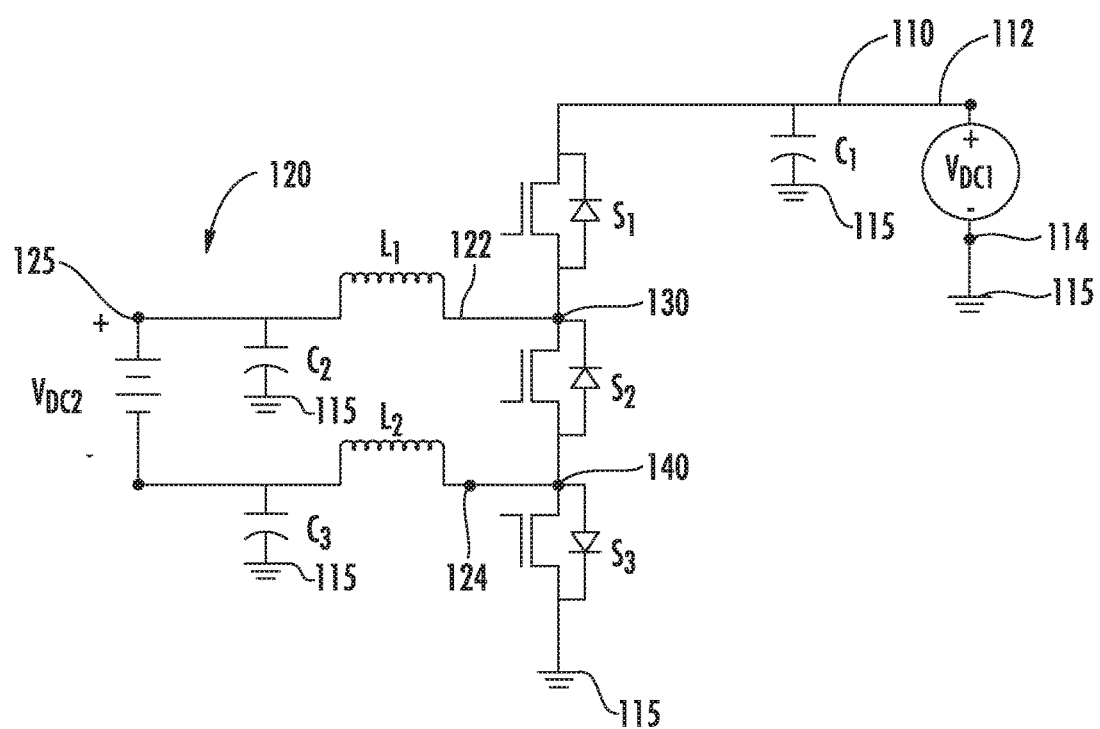
FIG. 2 depicts a circuit diagram of an example power converter according to example embodiments of the present disclosure.

FIG. 2 depicts an example power converter 100 according to example embodiments of the present disclosure. As shown, the power converter 100 can include a ground-referenced DC bus 110. The ground-referenced DC bus 110 can provide a DC voltage $V_{DC1}$ with respect to a ground reference 115. For example, the ground-referenced DC bus can provide a 1000V DC voltage with respect to a ground reference 115. In one implementation, a first terminal 112 (e.g., a positive terminal) of the ground-referenced DC bus 110 can be associated with the DC voltage $V_{DC1}$. A second terminal 114 (e.g., a negative terminal) of the ground-referenced DC bus 110 can be coupled to and associated with the ground reference (e.g., about 0 V). In some embodiments, the ground-referenced DC bus can be coupled to a ground reference through a capacitor C1.

The power converter 100 can further include a floating system 120. The floating system can include a first terminal 122 associated with a first DC voltage and a second terminal 124 associated with a second DC voltage. Neither the first terminal 122 nor the second terminal 124 is associated with a ground reference voltage. In one embodiment, the first DC voltage can be a positive DC voltage (e.g., 250 V). The second DC voltage can be a negative DC voltage (e.g., −250 V). The voltage difference between the first DC voltage and the second DC voltage can be the DC voltage $V_{DC2}$ associated with the floating system (e.g., 500 V). In some embodiments, the first terminal 122 can be coupled to the ground reference through a capacitor C2. The second terminal 124 can be coupled to the ground reference through a capacitor C3.

In some embodiments, the floating system 120 can be coupled to a battery energy storage device 125. The battery energy storage device 125 can include one or more sodium nickel chloride batteries, sodium sulfur batteries, lithium ion batteries, nickel metal hydride batteries, or other similar devices. The DC voltage associated with the ground-referenced DC bus $V_{DC1}$ can be greater than a floating voltage associated with the floating system $V_{DC2}$.

The present disclosure is discussed with reference to battery energy storage devices for purposes of illustration and discussion, those of ordinary skill in the art, using the disclosures provided herein, should understand that other energy storage devices (e.g. capacitors, fuel cells, etc.) can be used without deviating from the scope of the present disclosure.

The power converter 100 can further include three switching elements arranged in series (e.g., in a totem pole arrangement). More particularly, the power converter 100 can include a first switching element S1, a second switching element S2, and a third switching element S3 coupled in series between the ground-referenced DC bus 110 and the ground reference 115. In one embodiment, the first switching element S1 is coupled to the ground-referenced DC bus 110. The third switching element S3 is coupled to the ground reference 115. The second switching element S2 is coupled between the first switching element S1 and the third switching element S3.

In one embodiment, the first switching element S1, the second switching element S2, and the third switching element S3 can be semiconductor switching devices, such as insulated gate bipolar transistors (IGBTs) or power MOSFETs. Those of ordinary skill in the art, using the disclosures provided herein, will understand that the first switching element S1, the second switching element S2, and the third switching element S3 can be any suitable switching device, such as relays, power switches, or other devices, without deviating from the scope of the present disclosure.

In the example embodiment shown in FIG. 2, the first switching element S1 includes a MOSFET and a diode coupled in parallel. The second switching element S2 includes a MOSFET and a diode coupled in parallel. The third switching element S3 includes a MOSFET and a diode coupled in parallel. The drain of the MOSFET of the first switching element S1 can be coupled to the ground-referenced DC bus 110. The source of the MOSFET of the first switching element S1 can be coupled to node 130. The drain of the MOSFET of the second switching element S2 can be coupled to node 130. The source of the MOSFET of the second switching element S2 can be coupled to node 140.

In some embodiment, the third switching element D2 can be coupled to the system such that the third switching element is able to block current from the ground reference 115. For instance, as shown in FIG. 2, the source of the MOSFET of the third switching element S3 can be coupled to the ground reference 115. The drain of the MOSFET of the third switching element S3 can be coupled to the node 140. The diode of the third switching element S3 can be arranged to block current from the ground reference 115.

The first terminal 122 of the floating system 120 can be coupled to a first node 130 between the first switching element S1 and the second switching element S2. The second terminal 124 of the floating system 120 can be coupled to a second node 140 between the second switching element S2 and the third switching element S3. In some embodiments, the floating system 120 can include a first inductor L1 coupled to the first node 130. The floating system 120 can further include a second inductor L2 coupled to the second node 140.

The switching elements S1, S2, and S3 can be controlled by a control scheme to allow for bidirectional power flow between the ground-referenced DC bus 110 and the floating system 120. In some embodiments, the switching elements S1, S2, and S3 can be controlled using pulse width modulation (PWM) using a gate driving signals provided from one or more control devices.

In some embodiments, the first switching element S1 and the third switching element S3 are controlled to be switched synchronously with one another. The second switching element S2 is controlled to be switched complementary to the first switching element S1 and the third switching element S3. For instance, the second switching element S2 can be controlled to be conducting during at least a portion of a period when the first switching element and the third switching element are not conducting. The second switching element S2 can further be controlled to be non-conducting during at least a portion of a period with the first switching element S1 and the third switching element S3 are conducting.

Figure 3:
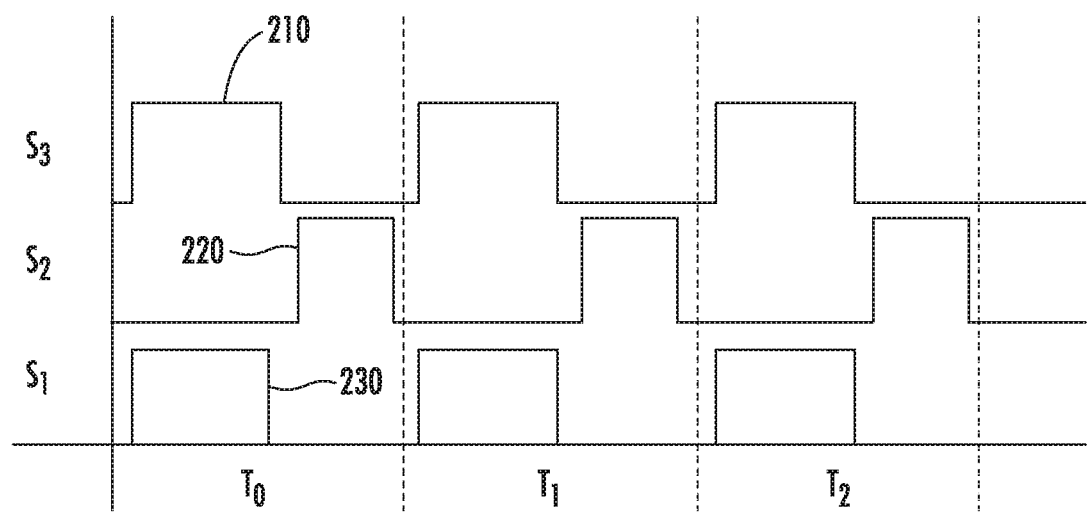
FIG. 3 depicts a graphical representation of an example switching scheme for a power converter according to example embodiments of the present disclosure.

FIG. 3 depicts a graphical representation of an example pulse width modulation scheme for switching the first switching element S1, the second switching element S2, and the third switching element S3 for three example pulse width modulation cycles T0, T1, and T2 according to example embodiments of the present disclosure. Curve 210 represents the pulse width modulation scheme for the first switching element S1. Curve 220 represents the pulse width modulation scheme for the second switching element S2. Curve 230 represents the pulse width modulation scheme for the third switching element S3.

As shown by curves 210 and 230, the first switching element S1 and the third switching element S3 are switched synchronously with one another. As shown by curve 220, the second switching element S2 is switched complementary to the first switching element S1 and the third switching element S3. More particularly, the second switching element S2 is switched to be conducting for at least a portion of a period when the first switching element S1 and the third switching element S3 are non-conducting. The second switching element S2 is switched to be non-conducting for at least a portion of a period when the first switching element S2 and the third switching element S3 are conducting.

When switching element S2 is conducting, the battery energy storage device 125 or other voltage source associated with the floating system 120 can, via inductors L1 and L2, develop a voltage in opposition to a current from the ground-referenced DC bus 110. When switching element S2 is non-conducting and switching elements S1 and S3 are conducting, the resulting potential can force current into or out of the ground-referenced DC bus 110, depending on the duty cycle of the first switching element S1 and the third switching element S3.

Figure 4:
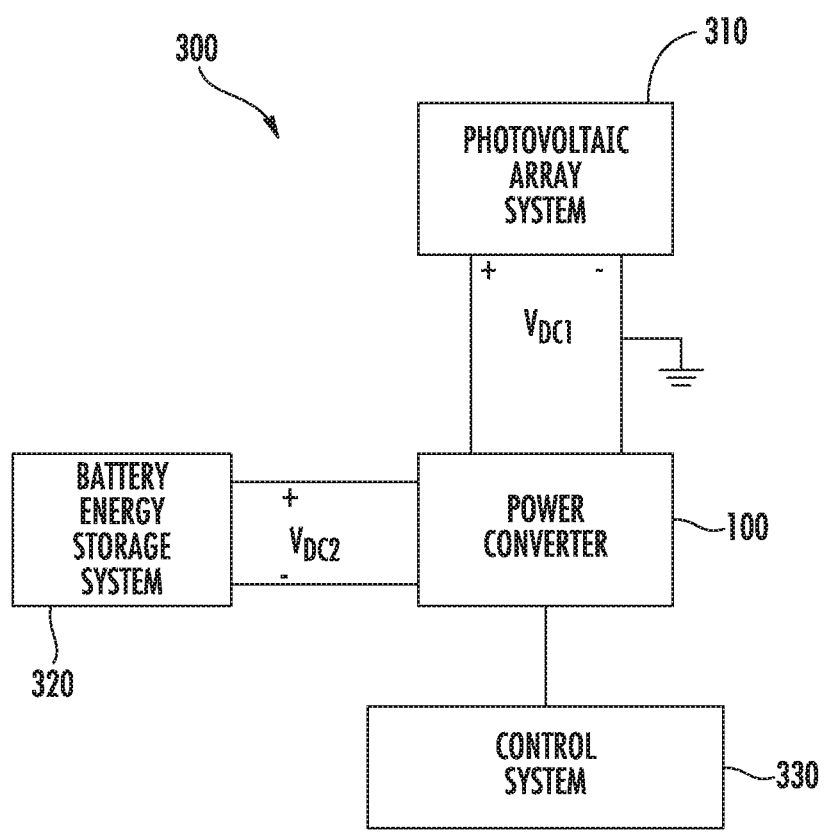
FIG. 4 depicts an example power system according to example embodiments of the present disclosure.

FIG. 4 depicts one example implementation of the power converter 100 in a power system 300 according to example embodiments of the present disclosure. The power system 300 can include a photovoltaic array system 310 comprising one or more solar panels configured to convert sunlight incident on the solar panel into DC power. In some embodiments, the photovoltaic array system 310 can include one or more power converters and/or other devices configured to convert a DC voltage generated by the solar panels into a DC voltage $V_{DC1}$ for a ground-referenced DC bus. Alternatively, the DC power generated by the solar panels can be provided directly to the ground-referenced DC bus as $V_{DC1}$. As shown in FIG. 4, at least one terminal associated with the photovoltaic array system 310 is grounded.

The power system 300 can further include a battery energy storage system 320. The battery energy storage system 320 can include one or more battery energy storage devices, such as sodium nickel chloride batteries, sodium sulfur batteries, lithium ion batteries, nickel metal hydride batteries, or other similar devices. The battery energy storage system 320 can be associated with a floating DC voltage $V_{DC2}$.

The power system 300 further includes a power converter 100 according to example embodiments of the present disclosure. The power converter 100 can be controlled to allow bidirectional power transfer between the photovoltaic array system 310 and the battery energy storage system 320. For instance, the power converter 100 can be controlled using a control system 330 (e.g., using PWM commands from the control system 330), for instance, to charge the battery energy storage devices in the battery energy storage system 320 or to track a power point of the photovoltaic array system 310. In some embodiments, the control system 330 can be configured to determine pulse width modulation commands for controlling the switching elements in the power converter according to example embodiments of the present disclosure to provide desired charging or discharging of the battery energy storage system 320.

Figure 5:
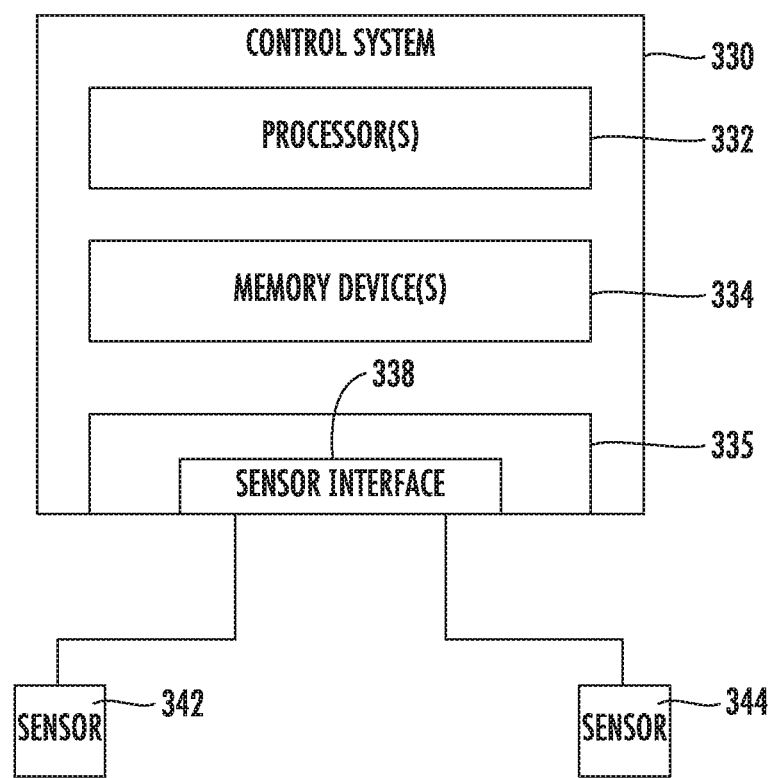
FIG. 5 depicts an example control system according to example embodiments of the present disclosure.

FIG. 5 depicts an example control system 330 that includes one or more control devices according to example embodiments of the present disclosure. The control system 330 can be or can include a master control system associated with, for instance, the power system (e.g., a system level or farm level controller) and/or can include one or more controllers associated with aspects of the power system, such as one or more controllers associated with the power converter 100. IN some embodiments, the one or more control devices can include one or more processor(s) 332 and one or more memory device(s) 334. The processor(s) 332 and memory device(s) 334 can be distributed so that they are located at one more locales or with different devices.

The processor(s) 332 and memory device(s) 334 can be configured to perform a variety of computer-implemented functions and/or instructions (e.g., performing the methods, steps, calculations and the like and storing relevant data as disclosed herein). The instructions when executed by the processor(s) 332 can cause the processor(s) 332 to perform operations according to example aspects of the present disclosure. For instance, the instructions when executed by the processor(s) 332 can cause the processor(s) 332 to implement the method of FIG. 6 discussed below.

Additionally, the control system 330 can include a communications interface 336 to facilitate communications between the control system 330 and the various components of the system 100. Further, the communications interface 336 can include a sensor interface 338 (e.g., one or more analog-to-digital converters) to permit signals transmitted from one or more sensors 342, 344 to be converted into signals that can be understood and processed by the processor(s) 332. It should be appreciated that the sensors (e.g. sensors 342, 344) can be communicatively coupled to the communications interface 338 using any suitable means, such as a wired or wireless connection. The signals can be communicated using any suitable communications protocol.

As such, the processor(s) 332 can be configured to receive one or more signals from the sensors 342 and 344. For instance, in some embodiments, the processor(s) 332 can receive signals indicative of the state of charge of the energy storage system from sensor 342, such as a monitoring device configured to monitor a state of charge of the energy storage devices. In some embodiments, the processor(s) 3322 can receive signals indicative of power delivery (e.g. amount of power charging/discharging) from sensor 344.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 334 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 334 can generally be configured to store suitable computer-readable instructions that, when implemented by the processor(s) 332, configure the controller 330 to perform the various functions as described herein.

FIG. 4 depicts one example implementation of the power converter 100 according to example embodiments of the present disclosure in a power system for purposes of illustration and discussion. Those of ordinary skill in the art, using the disclosures provided herein, will understand that the power converter 100 can be implemented in other power systems without deviating from the scope of the present disclosure.

Figure 6:
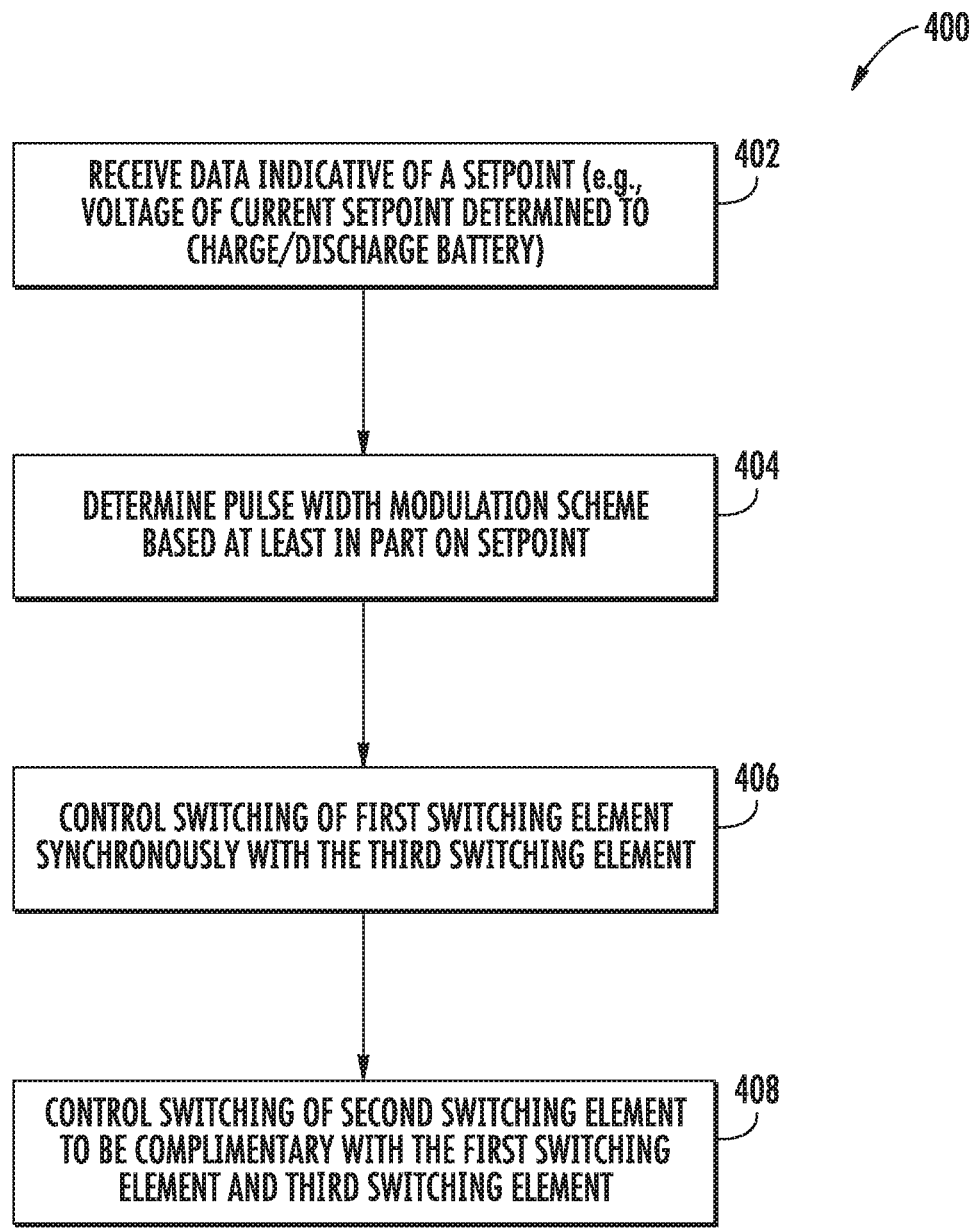
FIG. 6 depicts flow diagram of an example method according to example embodiments of the present disclosure.

FIG. 6 depicts a flow diagram of an example method (400) of controlling a DC to DC power converter according to example embodiments of the present disclosure. The method (400) can be used to control, for instance, the power converter 100 of FIG. 2. In addition, FIG. 6 depicts steps performed in a particular order for purposes of illustration and discussion. Those of ordinary skill in the art, using the disclosures provided herein, will understand that various steps of any of the methods discussed herein can be omitted, rearranged, expanded, adapted, and/or modified in various ways without deviating from the scope of the present disclosure.

At (402), the method includes receiving data indicative of a setpoint for operation of the power converter. The setpoint can be, for instance, a voltage setpoint for the ground-referenced DC bus 110 and/or for the floating system 120. In some embodiments, the setpoint can be, for instance, a current setpoint for charging and/or discharging a battery energy storage device 125 coupled to the floating system 120. In some embodiments, the setpoint can be determined based using a suitable charging algorithm.

At (404), the method includes determining a pulse width modulation scheme for switching the switching elements in the power converter based at least in part on the setpoint. For instance, a duty cycle for switching the first switching element S1, the second switching element S2, and/or the third switching element S3 to achieve the setpoint can be determined. A pulse width modulation scheme that specifies periods of time when the switching elements S1, S2, and S3 are conducting and are non-conducting can be determined based on the duty cycle. As discussed above, the pulse width modulation scheme can be determined such that the first switching element S1 is switched synchronously with the third switching element S3. The pulse width modulation scheme can be further determined such that the second switching element S2 is switched complementary to the first switching element S1 and the third switching element S3.

At (406), the method includes controlling the switching of the first switching element S1 synchronously with the switching of the third switching element S3 based on the pulse width modulation scheme. For instance, gate timing commands can be sent by a control system (e.g., via a suitable driver circuit) to drive the switching elements S1 and S3 so that the switching elements S1 and S3 are switched synchronously according to the pulse width modulation scheme.

At (408), the method includes controlling the switching of the second switching element S2 to be complementary to the first switching element S1 and the third switching element S3. For instance, gate timing commands can be sent by a control system (e.g., via a suitable driver circuit) to drive the switching element so that the second switching element S2 is switched complementary to the first switching element S1 and the third switching element S3. In one embodiment, the switching of the second switching element S2 is controlled so that the second switching element S2 is conducting during at least a portion of a period when the first switching element S1 and the third switching element S3 are non-conducting. In addition, the switching of the second switching element S2 can be controlled such that the second switching element S2 is non-conducting during at least a portion of a period when the first switching element S1 and the third switching element S3 are conducting.

Although specific features of various embodiments can be shown in some drawings and not in others, this is for convenience only. In accordance with the principles of the present disclosure, any feature of a drawing can be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A DC to DC power converter comprising: a ground reference;
    a ground-referenced DC bus associated with a DC voltage, the ground-referenced DC bus comprising a terminal coupled to the ground reference;
    a first switching element, a second switching element, and a third switching element coupled in series between the ground-referenced DC bus and the ground reference; and
    a floating system associated with a floating DC voltage, the floating system comprising a first terminal coupled to a first node between the first switching element and the second switching element, the floating system further comprising a second terminal coupled to a second node between the second switching element and the third switching element,
    wherein the first terminal of the floating system is coupled to the ground reference through a first capacitor and the second terminal of the floating system is coupled to the ground reference through a second capacitor.

2. The power converter of claim 1, wherein the power converter comprises one or more control devices configured to control switching of the first switching element, the second switching element, and the third switching element.

3. The power converter of claim 2, wherein the one or more control devices are configured to switch the first switching element and the third switching element synchronously with one another during at least a portion of a period when the second switching element is non-conducting to force a current into or out of the ground-referenced bus, and are configured to switch the second switching element such that the second switching element is conducting during at least a portion of a period when the first switching element and the third switching element are not conducting.

4. The power converter of claim 1, wherein the floating system comprises a first inductor coupled to the first node and a second inductor coupled to the second node.

5. The power converter of claim 1, wherein the DC voltage associated with the ground-referenced DC bus is higher than the floating DC voltage associated with the floating system.

6. The power converter of claim 1, wherein the floating system is coupled to an energy storage device.

7. The power converter of claim 6, wherein the energy storage device is a battery energy storage device.

8. The power converter of claim 6, wherein the ground-referenced DC bus is coupled to a photovoltaic array system.

9. The power converter of claim 1, wherein one or more of the first switching element, the second switching element, and the third switching element is an insulated gate bipolar transistor or a MOSFET.

10. A method of controlling a DC to DC power
    converter for bidirectional power transfer between a floating system and a ground-referenced DC bus, the power converter comprising a ground reference and a ground-referenced DC bus associated with a DC voltage, the ground-referenced DC bus comprising a terminal coupled to the ground reference, the power converter further comprising a first switching element, a second switching element, and a third switching element coupled in series between the ground-referenced DC bus and the ground reference, the floating system comprising a first terminal coupled to a first node between the first switching element and the second switching element and a second terminal coupled to a second node between the second switching element and the third switching element, wherein the first terminal of the floating system is coupled to the ground reference through a first capacitor and the second terminal of the floating system is coupled to the ground reference through a second capacitor, the method comprising:

receiving, by one or more control devices, data indicative of a set point for the floating system;

determining, by the one or more control devices, a pulse width modulation scheme for switching the first switching element synchronously with the third switching element based on the set point; controlling, by the one or more control devices, the switching of the first switching element synchronously with the third switching element based on the pulse width modulation scheme; and controlling, by the one or more control devices, the switching of the second switching element so that the second switching element is conducting during at least a portion of a period when the first switching element and the third switching element are non-conducting.

11. The method of claim 10, wherein the switching of the second switching element is controlled so that the second switching is non-conducting during at least a portion of a period when the first switching element and the second switching element are conducting.

12. The method of claim 10, wherein the setpoint is a voltage setpoint or a current setpoint.

13. The method of claim 10, wherein the floating system is coupled to a battery energy storage device.

14. The method of claim 13, wherein the setpoint is selected based at least in part on charging or discharging the battery energy storage device.

15. A power system comprising: a ground reference;

a ground-referenced DC bus coupled to a photovoltaic array system, the ground-referenced DC bus comprising a terminal coupled to the ground reference;

a first switching element, a second switching element, and a third switching element coupled in series between the ground-referenced DC bus and the ground reference;

a floating system coupled to at least one battery energy storage device, the floating system comprising a first terminal coupled to a first node between the first switching element and the second switching element and a second terminal coupled to a second node between the second switching element and the third switching element, and a control system configured to control switching of the first switching element, the second switching element, and the third switching element;

wherein the control system is configured to switch the first switching element and the third switching element synchronously with one another, the control system further configured to switch the second switching element in a manner complementary to the first switching element and the third switching element, the control system further configured to switch the second switching element such that the second switching element is conducting during at least a portion of a period when the first switching element and the third switching element are not conducting, and wherein the first terminal of the floating system is coupled to the ground reference through a first capacitor and the second terminal of the floating system is coupled to the ground reference through a second capacitor.

16. The power system of claim 15, wherein the control system is configured to control switching of the second switching element such that that the second switching element is non-conducting during at least a portion of a period when the first switching element and the second third switching element are conducting to force a current into or out of the ground-referenced bus.

17. The power converter of claim 15, wherein the floating system comprises a first inductor coupled to the first node and a second inductor coupled to the second node.

* * * * *